(12) United States Patent
Lalouette (10) Patent No.: US 7,480,136 B2
(45) Date of Patent: Jan. 20, 2009

(54) REMOVABLE DISC DRIVE CARTRIDGE WITH IMPROVED REGISTRATION

(75) Inventor: Marc J. Lalouette, Boulder, CO (US)

(73) Assignee: Lalouette Design, LLC, Boulder, CO (US)

( * ) Notice: Subject to any disclaimer, the term of this patent is extended or adjusted under 35 U.S.C. 154(b) by 124 days.

(21) Appl. No.: 11/497,978

(22) Filed: Aug. 1, 2006

(65) Prior Publication Data

US 2008/0030944 A1 Feb. 7, 2008

(51) Int. Cl.
*G06F 1/16* (2006.01)

(52) U.S. Cl. .................. 361/685; 720/600; 174/52.1; 248/562

(58) Field of Classification Search ............... 720/600, 720/657; 174/52.1, 50; 248/73, 560, 562; 360/97.02, 97.03; 361/679–687, 724–727

See application file for complete search history.

(56) References Cited

U.S. PATENT DOCUMENTS

| 4,941,841 | A | | 7/1990 | Darden et al. |
|---|---|---|---|---|
| 5,837,934 | A | | 11/1998 | Valavanis et al. |
| 6,005,768 | A | * | 12/1999 | Jo .............................. 361/685 |
| 6,154,360 | A | | 11/2000 | Kaczeus, Sr. et al. |
| 2002/0089820 | A1 | * | 7/2002 | Abboud ..................... 361/685 |
| 2003/0174464 | A1 | * | 9/2003 | Funawatari et al. ......... 361/685 |
| 2005/0257949 | A1 | | 11/2005 | Lalouette |
| 2006/0232922 | A1 | * | 10/2006 | Tong .......................... 361/685 |

* cited by examiner

*Primary Examiner*—Hung V Duong
(74) *Attorney, Agent, or Firm*—Marjama Muldoon Blasiak & Sullivan LLP (57) ABSTRACT

A removable disc drive cartridge providing an improved combination of shock protection and electrical alignment (registration) of a enclosed removable disc drive.

8 Claims, 8 Drawing Sheets

REMOVABLE DISC DRIVE CARTRIDGE WITH IMPROVED REGISTRATION

This application is being filed as a non-provisional patent application under 37 C.F.R. 1.53(b).

FIELD OF THE INVENTION

This invention relates generally removable disc drives, also referred to as disc drive cartridges, and in particular to a disc drive cartridge configured to provide an improved combination of shock protection and electrical interface alignment (registration) to other computer hardware.

BACKGROUND OF THE INVENTION

A removable disc drive cartridge is a type of removable media that is employed to store and to physically transport data between two different locations. Typically, a disc drive cartridge transports data between two different computers that are each located at different locations. Other types of removable media, such as a compact disc (CD), a digital video disc (DVD), a tape cartridge or a flash memory key can also be used to physically transport data between two different computers.

Patents and patent publications that relate to the general subject matter of removable disc drive cartridges include U.S. Pat. No. 4,941,841 to Darden, U.S. Pat. No. 5,837,934 to Valavanis, U.S. Pat. No. 6,154,360 to Kaczeus, and U.S. 2005/0257949 to Lalouette. Differences between the subject invention and these patents and patent publications will be described in the following invention description.

SUMMARY OF THE INVENTION

The invention provides an improved combination of shock protection and electrical interface alignment (registration) for a removable disc drive cartridge.

BRIEF DESCRIPTION OF THE DRAWINGS

The objects and features of the invention can be better understood with reference to the claims and drawings described below. The drawings are not necessarily drawn to scale, and the emphasis is instead generally being placed upon illustrating the principles of the invention. Within the drawings, like reference numbers are used to indicate like parts throughout the various views. Differences between like parts may cause those parts to be indicated by different reference numbers. Unlike parts are indicated by different reference numbers.

For a further understanding of these and objects of the invention, reference will be made to the following detailed description of the invention which is to be read in connection with the accompanying drawing, wherein.

DETAILED DESCRIPTION OF THE INVENTION

Figure 1A:
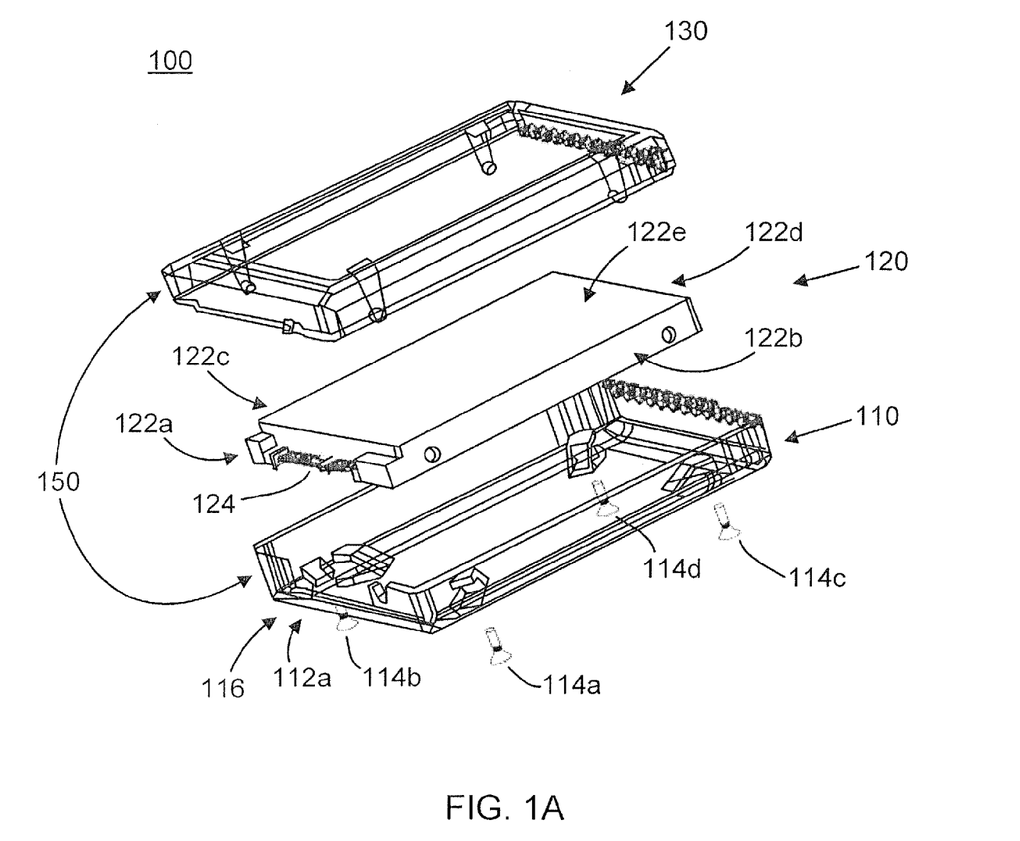
FIG. 1A illustrates an exploded view of a removable disc drive cartridge.

FIG. 1A illustrates an exploded view of an embodiment of a removable disc drive cartridge 100. As shown, the removable disc drive cartridge 100, also referred to as a cartridge 100, is comprised of an enclosure 150 that includes a top portion 130 and a bottom portion 110. The top 130 portion and the bottom 110 portion are shaped and sized to fit together to form the enclosure 150 that encloses a cavity within which a disc drive is located and protected. The enclosure 150 is configured to substantially surround and to protect a disc drive 120 from sudden movements (shocks), such as for example, caused by an impact between the enclosure and another object.

The disc drive 120 has a front side 122a, left side 122b, a right side 122c, rear side 122d, top side 122e and bottom side 122f (Shown in FIG. 1B) A plurality of electronic connectors 124 protrude from the front side 122a of the disc drive 120. The electronic connectors 124 are configured to electronically connect to a complementary set of electronic connectors provided within a receiving bay (not shown) of a host computer or a peripheral of a host computer (not shown).

The enclosure 150 is configured to provide an opening 116 within its front side 112a to allow passage of electronic connectors 124 protruding from the front side 122a of the disc drive 120. In the embodiment shown, the front side 112a of the bottom portion 110 of the enclosure 150 provides the opening 116 within the enclosure 150. In other embodiments, the opening 116 can be provided within the top portion 130 of the enclosure 150.

Four screws 114a-114d can be each inserted through a separate opening, each proximate to a mounting and shock absorbing component (See FIG. 2A), and located in the bottom surface of the bottom portion 110 of the enclosure 150. The screws 114a-114d are configured to mate with screw holes located on the bottom surface of the bottom portion 110 of the enclosure 150 (Shown in FIG. 1B)

Figure 1B:
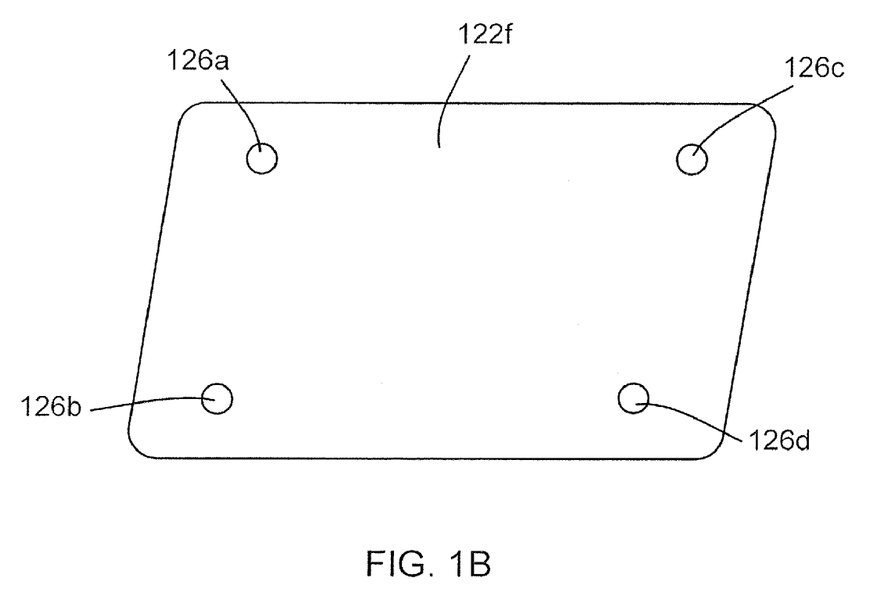
FIG. 1B illustrates the bottom side of the disc drive that includes (4) mounting holes that are provided with the disc drive.

FIG. 1B illustrates the bottom side (surface) 122f of the disc drive 120 that includes (4) mounting locations 126a-126d that are manufactured as part of the disc drive 120. In this embodiment, each mounting location 126a-126d is implemented as a screw hole configured to receive a screw 114a-114d (Shown in FIG. 1A). As shown, each mounting location 126a-126d is configured provide a physical (mounting) attachment between the disc drive 120 and the bottom portion 110 of the enclosure 110 (Shown in FIG. 1A).

Figure 2A:
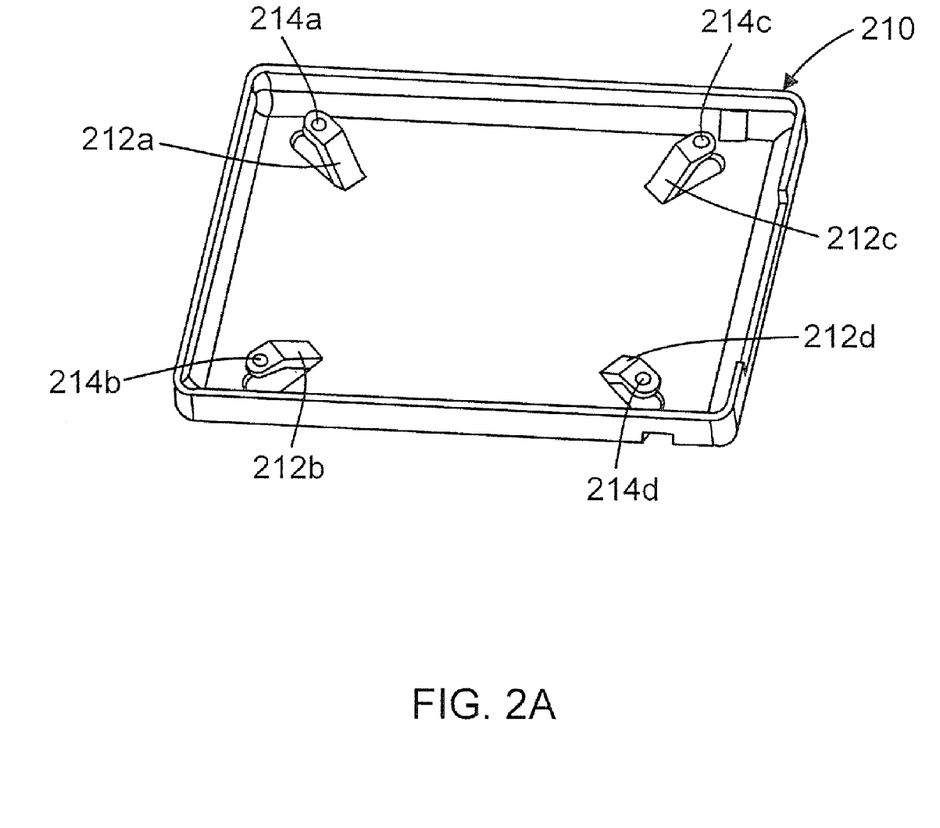
FIG. 2A illustrates a top-down view of a plurality of mounting and shock absorbing components residing within an embodiment of the bottom portion of the disc drive cartridge enclosure, in accordance with the invention.

FIG. 2A illustrates a top-down view of a plurality of mounting and shock absorbing components 212a-212d manufactured as part of an embodiment 210 of the bottom portion 110 of the disc drive cartridge enclosure 150, in accordance with the invention. As shown, (4) mounting and shock absorbing components 212a-212d, also referred to as mounting and shock absorbing struts 212a-212d or struts 212a-212d, are configured to attach to the bottom side 122f of the disc drive 120.

Each strut 212a-212d includes an opening 214a-214d configured to allow access to each of the mounting locations 126a-126d residing on the bottom side 122f of the disc drive 120. In some embodiments, a screw is configured to be inserted upwards and rotated through each of the openings 214a-214d and respectively into and engaging each of the screw holes (mounting locations) 126a-126d of the bottom side 122f of the disc drive 120 in order to form an attachment between each strut 212a-212d and the disc drive 120.

In accordance with the invention, the struts 212a-212b, also referred to as the front struts 212a-212b that are located along the front side of the bottom portion 110 of the enclosure 150, are configured to provide rigid support to the front side of the disc drive 120 and rigid support to the position of the electronic connectors 124 within the enclosure 150. In some embodiments, the struts 212c-212d, also referred to as the rear struts 212c-212d, also provide the same rigid support as the front struts 212a-212b. In other embodiments, the rear struts 212c-212d provide less rigid and more flexible support, by being configured for more deflection in response to a shock (force), than any deflection provided by the front struts 212a-212b in response to a shock (force).

Rigid support of the position of the electronic connectors 124 within the enclosure 150 enables proper alignment (registration) of the electronic connectors 124 in order for the electronic connectors 124 to connect with complementary electronic connectors located and positioned within a bay of a computer or peripheral within which the cartridge 100 is to be installed (not shown).

In some embodiments, the rigid forward struts 212a-212b are made from, Acrylonitrile Butadiene Styrene (ABS) plastic or some other metallic material such as aluminum or magnesium, for example. In accordance with the invention, the forward struts 212a-212b are not made from elastomeric materials, such as rubber or materials having deflection properties of rubber. Elastomeric materials do not provide sufficient rigid support for the electronic components 124.

Some prior art removable disc cartridges require use of an intermediate electronic connector, also referred to as an interposer, to connect the electronic connectors 124 with the complementary electronic connectors located and positioned within a bay of a computer or peripheral within which the cartridge 100 is to be installed. Interposers create additional cost, interfere with signal integrity and can cause reliability issues.

Like embodiments of the invention, other prior art removable disc cartridges do not require use an interposer and provide an opening through which the electronic connectors 124 may pass through and protrude from the enclosure 150 in order to connect to the complementary electronic connectors located and positioned within a bay of a computer or peripheral within which the cartridge 100 is to be installed.

Unlike the embodiments of the invention, the aforementioned other prior art does not provide sufficiently rigid support to the front end 122a of the disc drive 120 and consequently, the front end 122a and the electronic connectors 124 can become misaligned within the enclosure 150 of the cartridge 100. As a result, the electronic connectors will often not properly connect with the complementary electronic connectors when installing the cartridge 100 within a bay of a computer or peripheral. This type of circumstance is inconvenient for users of the removable disc cartridge 100. Embodiments of the invention are designed to avoid this type of circumstance.

Figure 2B:
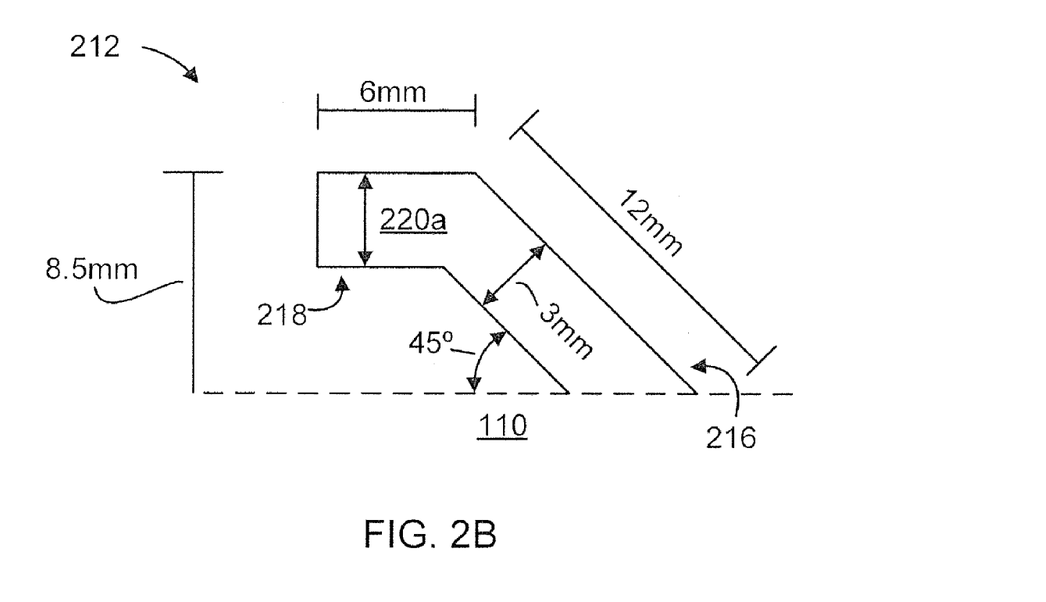
FIG. 2B illustrates a side view of an embodiment of individual mounting and shock absorbing strut of FIG. 1A.

FIG. 2B illustrates a side view of an embodiment of an individual mounting and shock absorbing strut 212 of FIG. 1A. This side view shows a near longitudinal side 220a of the strut 212. The strut 212 includes a lower portion 216 and an upper portion 218. A lower portion of the strut 212 rises above a wall of the bottom portion 110 of the enclosure 150 at approximately a 45 degree angle. The upper portion 218 of the strut 212 is oriented approximately parallel to the wall of the bottom portion 110 of the enclosure 150. Both the lower 216 and upper 218 portions are approximately 3 mm in thickness. A top surface of the lower portion 216 is approximately 12 mm in length and a top surface of the upper portion is approximately 6 mm in length (as shown). The top surface of the upper portion 218 is approximately 8.5 mm above the top surface of the wall of the bottom portion 110 of the enclosure 150.

Figure 2C:
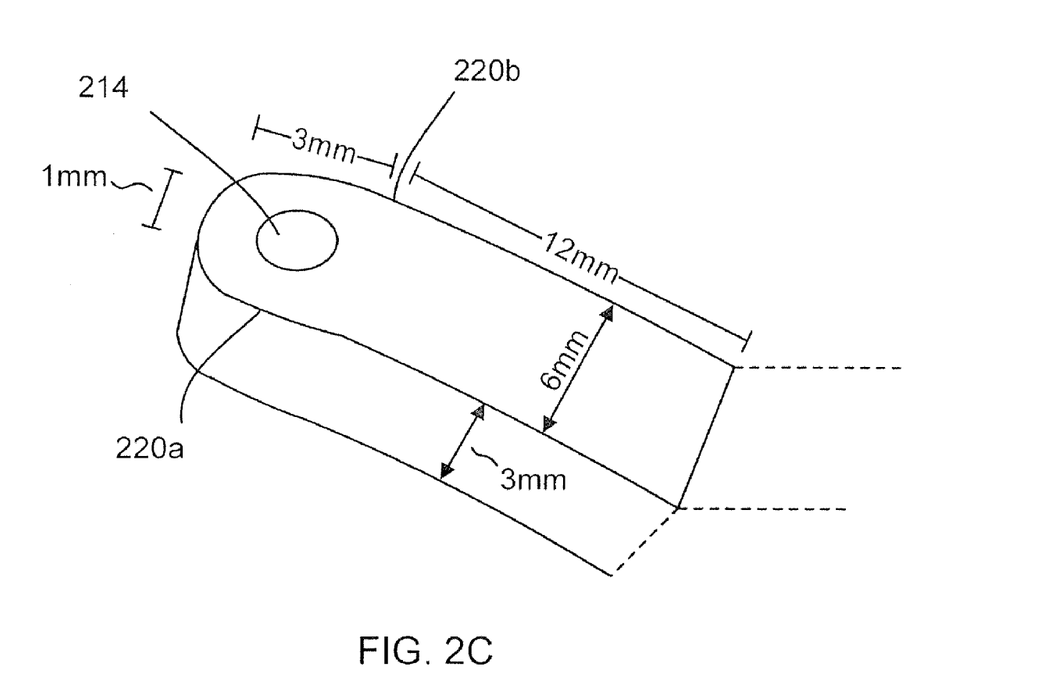
FIG. 2C illustrates a perspective view of the embodiment of individual mounting and shock absorbing strut of FIGS. 2A-2B.

FIG. 2C illustrates a perspective view of the embodiment of individual mounting and shock absorbing strut 212 of FIGS. 2A-2B. The width of the lower 216 and upper 218 portions is approximately 6 mm. The opening 214 is circular in shape and has a diameter of approximately 1 mm. The opening 214 is centered between the near longitudinal edge 220a and a far longitudinal edge 220b of the top surface of the strut 212.

Each strut 212a-212d is configured to deflect vertically and/or horizontally to counteract potential forces applied to the enclosure 150 from vertical and/or horizontal directions. A particular deflection of a strut in a direction can be quantified in terms of an amount of energy required to cause that particular deflection, also referred to as a strain energy.

Each strut 212a-212d is configured for a vertical (Y axis) down deflection caused from dropping the cartridge 150 (oriented top side up and bottom side down), including a disc drive 120, from a height of one meter onto a rigid floor. Impact between a bottom side of the bottom portion 110 of the enclosure 150 with the floor creates an upward force causing a downward deflection of the struts 212a-212d. For this type of drop, the bottom side (not shown) of the cartridge 150 physically impacts the floor while being oriented parallel to the floor.

Each strut 212a-212d is also configured for deflection towards the front side 122a or the rear side 122d (Z axis) or towards the left side 122b or the right side 122c (X axis) of the enclosure 150 in response to a force (shock) applied to the enclosure 150.

In one embodiment, the cartridge 150 has dimensions of 24.5 mm (height)×85.7 mm (width)×111.9 mm (length). In some embodiments, removable disc drive cartridges can be dimensioned to comply with standards associated with a Standard Form Factor (SFF). Under a first variation of the SFF standard, a disc drive has a height of 9.5 cm and under a second variation of the SFF standard, a disc drive has a height of 12.5 cm.

For example, under the first variation of the SFF standard, a disc drive has dimensions of 9.5 mm (height)×69.85 mm (width)×100.2 mm (length). When enclosed within the enclosure 150 having a 2 mm wall thickness, there remains (24.5−9.5) mm−(2 walls)(2 mm/wall)=11 mm of vacant height (Y axis) space within the enclosure 150, (85.7−69.85) mm−(2 walls)(2 mm/wall) mm=11.85 mm vacant width (X axis) space within the enclosure 150, and (111.9−100.2)−(2 walls)(2 mm/wall)=7.7 mm vacant length (Z axis) space within the enclosure 150.

When the disc drive 120 is centered within the enclosure 150, the vacant space in any dimension (height, width or length) is divided into two separate portions that are each located on opposite sides of the disc drive 120. Each separate portion is referred to as sway space. For the example described above, the dimensions of the sway space is 11 mm/2=5.5 mm of sway space in the height dimension (Y axis), 11.85 mm/2=5.925 mm sway space in the width dimension (X axis) and 7.7 mm/2=3.85 mm of sway space in the length dimension (Z axis), when the disc drive 120 is centered within the enclosure 150.

Preferably, for a force (shock) applied in a given direction, the strut should not deflect so far that the disc drive 120 physically impacts a wall of the enclosure 150. For example, considering that the struts 212a-212d each have a height dimension of approximately 8.5 mm above the bottom wall of the enclosure 150, when deflecting in the vertical down direction, a deflection of greater than 8.5 mm would cause the disc drive 120 to physically impact the bottom wall of the enclosure 150. Hence, each strut 212a-212d should vertically deflect less than 8.5 mm from the force (shock) of the bottom side (wall) of the enclosure impacting a rigid floor from a fall of the enclosure 150 and the enclosed disc drive 120 from a height of one meter.

Like wise, if the disc drive 120 is centered within the enclosure 150, the (X axis) deflection of the struts 212a-212d should be limited to 5.925 mm in a direction along the (X axis) and limited to 3.85 mm in a direction along the (Z axis).

Notice that the disc drive 120, when supported by the struts of FIGS. 2A-2C, is located approximately 8.5 mm, minus a small deflection to support the weight of the disc drive 120, above the wall of the bottom portion 110 of the enclosure 150. This location is not exactly centered within the cavity formed by the enclosure given that the vertical (Y axis) vacant space is 11.85 mm. If centered, the disc drive 120 would be located approximately 11/2=5.5 mm above the wall of the bottom portion 110 of the enclosure 150.

In other embodiments, the configuration of the struts 212a-212d, specifically the shape and size of the struts 212a-212d, is altered to support the disc drive 120 at other heights above the top surface of the wall of the bottom portion 110. For example, the struts 212a-212d can be configured to have a height of 5.5 mm instead of 8.5 mm. In one embodiment, the angle of the strut 212a-212b can be altered to be less than 45 degrees, instead of equaling 45 degrees, as shown in FIG. 2B. This would enable the disc drive 120 to be centered within the cavity.

The mass of the disc drive 120 is typically between 80-140 grams. The mass of an enclosure made from ABS plastic is approximately 15 grams. A disc drive 120 is typically designed to withstand an impact of 800 G without sustaining serious damage. The energy of a fall of a combined mass of 155 grams (0.155 kilograms) equals 0.155 kilograms×9.81 Newtons/kilogram×1 meter=1.5 Newton Meters (Joules)

The energy required to cause a specified deflection, also referred to as the strain energy, is a function of the amount of deflection squared times one-half of a spring constant. Hence, a spring constant equal to approximately 111000 Newtons/kg would correspond to strain energy of 1.5 joules for a deflection amount of approximately 5.2 mm ((0.0052 m)**2) (111,000)/2=1.5 joules For example, a spring constant equal to approximately 195,000 Newtons/meter would correspond to strain energy of 1.5 joules when deflecting approximately 3.9 mm. In order to limit the impact force to below 800 G, the struts 212a-212d must collectively absorb the strain energy of a 1 meter drop without imposing an acceleration on the disc drive greater than 800 G. The acceptable spring constant for the combined supporting struts employed lies within the range of approximately 111,000 newtons per meter to 195,000 newtons per meter.

In many embodiments, each strut 212a-212d, as designed and manufactured, is likely to have a unique and different spring constant of deflection for a direction along each of the X, Y and Z axes. For example, a strut 212a-212d may have a spring constant of deflection of 120,000 in the Y axis direction, by have a spring constant of 200,000 in the X axis direction and 250,000 in the Z axis direction.

In accordance with the invention, a substantially rigid strut 212a-212b is not intended to include an entirely rigid strut, such as a strut made from a little deflecting or non-deflecting material. A substantially rigid strut 212a-212d is configured to provide at least a minimum (greater than zero) amount of deflection. In accordance with this objective, in some embodiments, the struts 212a-212d are configured to deflect in accordance with a spring constant of less than or equal to 200,000 Newtons per Meter.

Likewise, in accordance with the same objective, in some embodiments, the struts 212a-212d configured to deflect at least 20 percent relative to a range of deflection between the strut 212a-212d at rest (undeflected except for miniscule deflection required to support a disc drive) and at maximum permitted deflection without making physical contact with a wall of the encloaure.

With respect to FIG. 2B, the deflection of the strut 212a-212d at rest, is a miniscule deflection (less than 0.1 mm) of the strut when supporting a 140 gram disc drive 120. The maximum permitted deflection of the strut 212a-212d is approximately 8.5 mm. Hence, a 20 percent deflection within the above described range would equal approximately (0.2)(8.5 mm)=1.7 mm.

In accordance with the invention, a substantially rigid strut 212a-212b is not intended to include a substantially flexible strut, such as a strut made from elastomeric material. In some embodiments, the struts 212a-212d are configured to deflect in accordance with a spring constant of greater than or equal to 100,000 Newtons per Meter.

Figure 3:
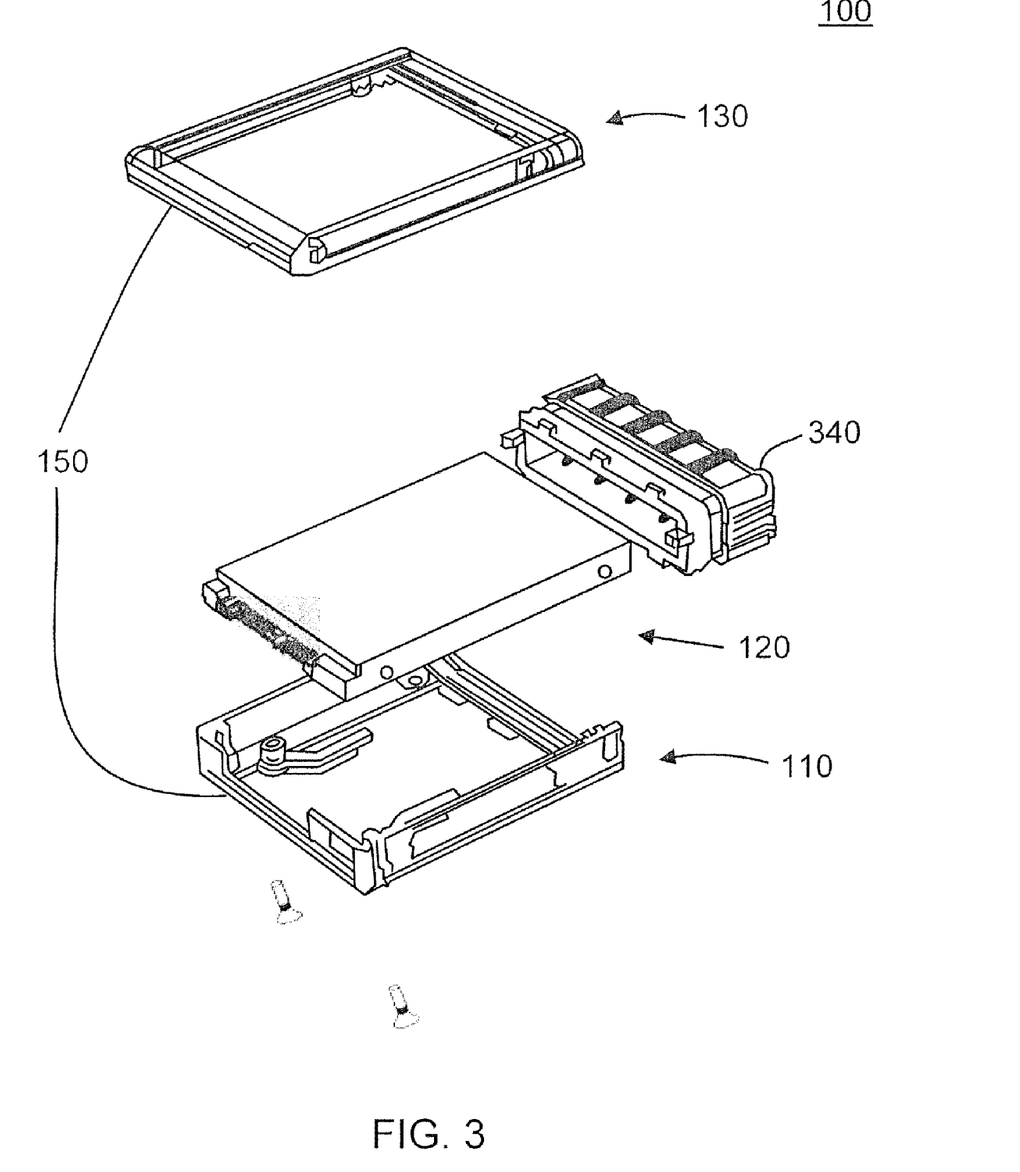
FIG. 3 illustrates an exploded view of a removable disc drive cartridge enclosure including an elastomeric outer rear mounting and shock absorbing component.

FIG. 3 illustrates an exploded view of a removable disc drive cartridge enclosure including an elastomeric outer rear mounting and shock absorbing component 340. The outer rear mounting and shock absorbing component 340, also referred to as a rear mount 340, is made of an elastomeric material. An elastomeric material is a material that has properties of rubber and that generally provides less rigid support than ABS or other plastics or metals, for example. In accordance with the invention, an elastomeric material is not employed for manufacturing the front struts 212a-212b.

As shown, the rear mount 340 is shaped and sized to surround and enclose the rear side 122d of the disc drive 120. Preferably, the rear mount 340 is shaped and sized to form a friction fit over the rear side 122d of the disc drive 120.

As shown, the rear mount 340 is configured to provide substantially less rigid support for the rear side 122d of the disc drive 120 than the rigid support provided for the front side 122a of the disc drive 120 by the front struts 122a-122b, as previously described. As a result, the rear mount 340 can permit the rear side 122d of the disc drive 120 to deflect a farther distance in response to a force applied to the cartridge 100 than any deflection permitted for the front side of the disc drive 120 by the front struts 122a-122b.

Preferably, the no portion of the disc drive 120, including its rear side 122d, should be permitted to deflect so far as to make physical contact in any of the X, Y or Z axis directions, with a wall of the enclosure 150, as a result of forces applied to the enclosure 150 that are within a pre-determined range of force (shock) applied to the cartridge 100.

Figure 4:
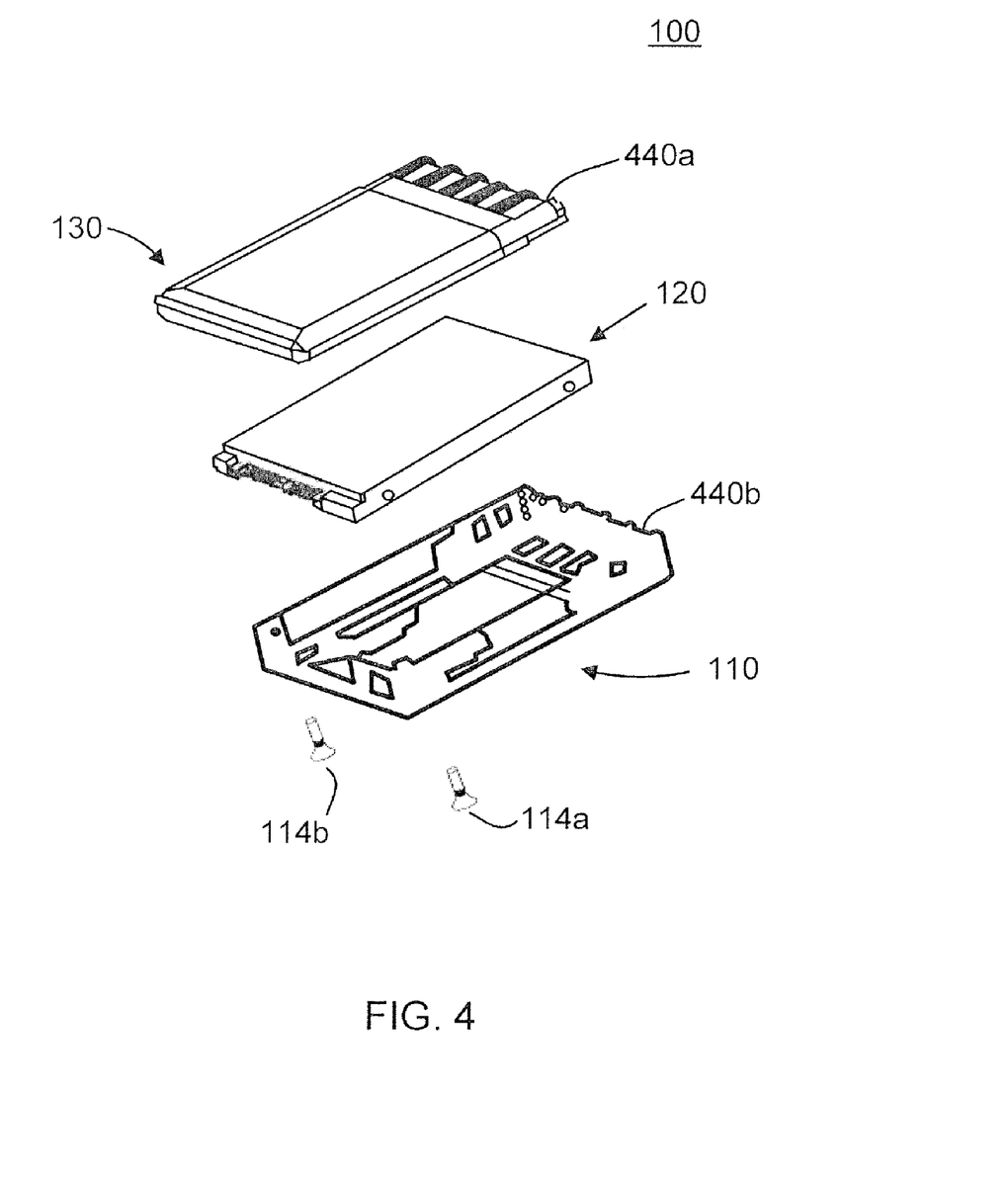
FIG. 4 illustrates an exploded view of a removable disc drive cartridge enclosure including a rear mounting and shock absorbing component that is overmolded around a rear side of the bottom portion and the top portion of the enclosure.

FIG. 4 illustrates an exploded view of a removable disc drive cartridge enclosure 150 including a rear mounting and shock absorbing component 440a-440b, also referred to as a rear mount 440a-440b, that is over molded around a rear side of the bottom portion 110 and the top portion 130 of the enclosure 150. Like the rear mount 340 of FIG. 3, this embodiment of the rear mount 440a-440b is made of an elastomeric material and is configured to provide substantially less rigid support for the rear side 122d of the disc drive 120 than the rigid support provided for the front side 122a of the disc drive 120 by the front struts 122a-122b, as previously described.

As a result, the rear mount 440a-440b can permit the rear side 122d of the disc drive 120 to deflect a farther distance in response to a force applied to the cartridge 100 than any deflection permitted for the front side of the disc drive 120 by the front struts 122a-122b. In effect, in accordance with the embodiments of FIGS. 3-4, the disc drive 120 deflects in hinge like fashion when dropped onto a rigid floor as previously described where the front struts 122-a-122b can appear to act like a hinge while the rear side 122d acts like a plane, such as a door, tilting (rotating) around from a hinge over a small angle of rotation.

Figure 5A:
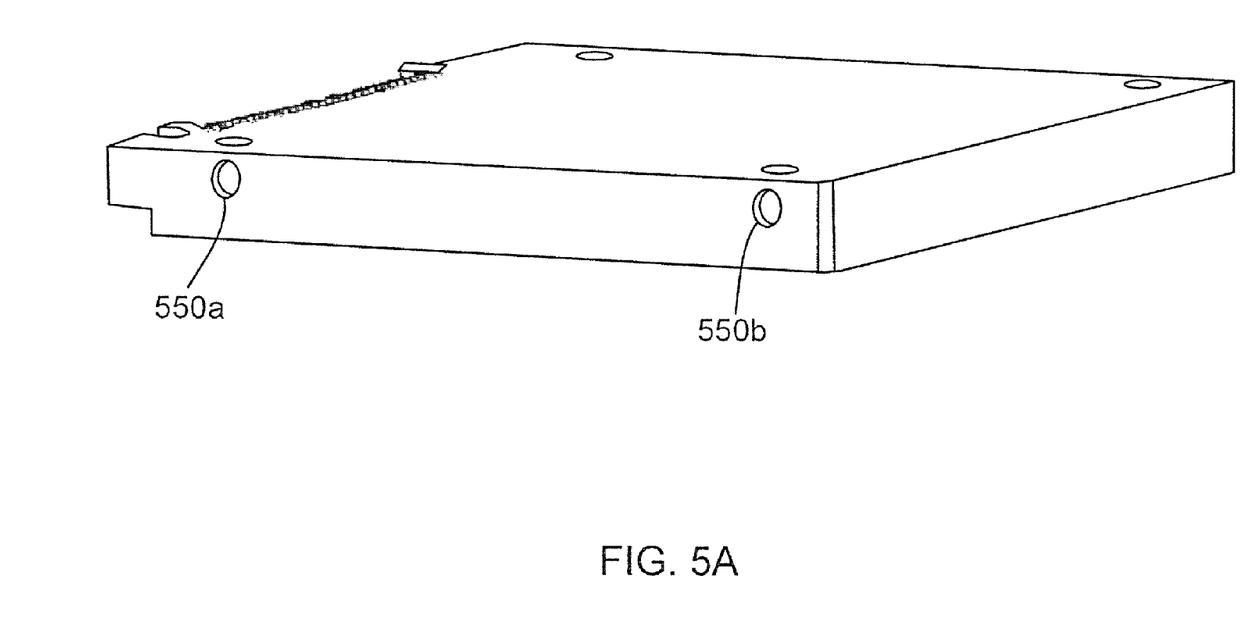
FIG. 5A illustrates a close up view of holes located along the left side and the right side (not shown) of the disc drive that are configured to engage snap hooks.

FIG. 5 illustrates a close up view of holes located along the left side and the right side of the disc drive 120 that are configured to engage snap hooks. The snap hooks (not shown) can be attached to the top portion 130 or the bottom portion 110 of the enclosure 150. In this embodiment, the snap hooks enable snap together assembly between the disc drive and the upper portion, or between the disc drive and the lower portion or between the upper portion and the lower portion, or any combination thereof.

Figure 5B:
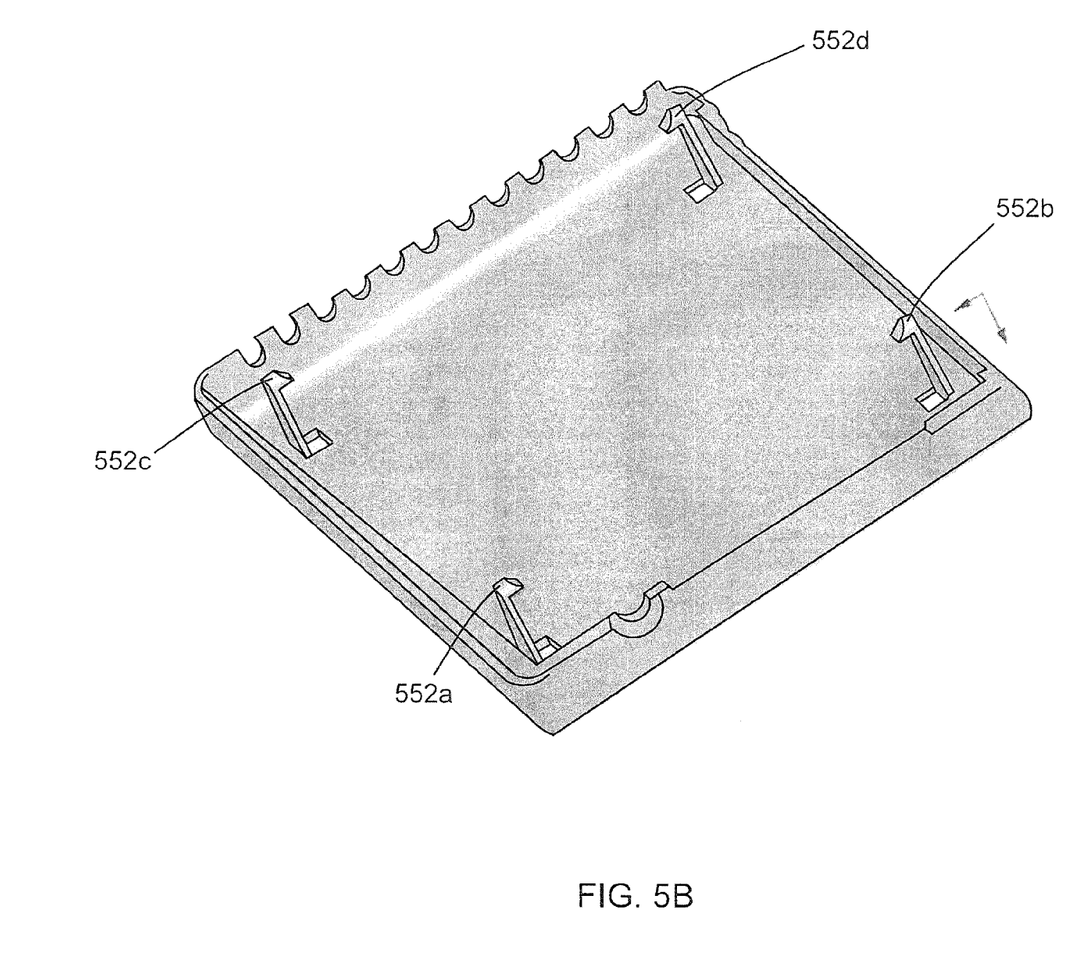
FIG. 5B illustrates a close up view of hooks located within the top portion of the enclosure that are configured to snap assemble and engage the holes of FIG. 5A.

FIG. 5B illustrates a close up view of hooks 552a-552d that protrude from the top portion 130 of the enclosure 150 and that are configured to snap assemble and engage the holes 550a-550d of FIG. 5A. In other embodiments, the hooks are configured to engage holes (not shown) manufactured as part of the bottom portion 110 of the enclosure 150

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A disc drive enclosure comprising:
an outer surface enclosing a cavity;
said cavity having a height, a width and a length dimension and being configured to surround a disc drive having a height, a width and a length dimension, each of said height, said width and said length dimension of said cavity being respectively greater than or equal to said height, said width and said length dimension of said disc drive;
an opening within a front side of said outer surface that is configured to allow passage of electronic connectors protruding from a front side of said disc drive; and where said disc drive is mounted to one or more substantially rigid mounting and shock absorbing struts that are made from non-elastomeric material and that are configured for deflection in response to a shock applied to said outer surface.

2. The disc drive enclosure of claim 1 where said substantially rigid mounting and shock absorbing struts include one or more front mounting and shock absorbing struts that are located more proximate to said front side and located less proximate to an opposite rear side of said disc drive, and one or more rear mounting and shock absorbing struts that are located less proximate to said front side and located more proximate to said opposite rear side of said disc drive, and where said front mounting and shock absorbing struts are substantially more rigid than said rear mounting and shock absorbing struts.

3. The disc drive enclosure of claim 2 where said front mounting and shock absorbing struts deflect approximately in accordance with a spring constant equal to or greater than 111,000 Newtons per Meter.

4. The disc drive enclosure of claim 2 where said rear mounting and shock absorbing struts deflect in accordance with properties of elastomeric material.

5. The disc drive enclosure of claim 1 that is configured for snap together assembly between the disc drive and an upper portion of the enclosure, or between the disc drive and a lower portion of the disc drive or between the upper portion and the lower portion.

6. The disc drive enclosure of claim 1 where the substantially rigid mounting and shock absorbing struts are configured to deflect in accordance with a spring constant of equal to or greater than 100,000 Newtons per Meter and less than or equal to 200,000 Newtons per Meter.

7. The disc drive enclosure of claim 1 where the substantially rigid mounting and shock absorbing struts are configured to deflect at least 20 percent relative to a range of deflection between a mounting and shock absorbing struts at rest and at maximum permitted deflection of said struts within said cavity.

8. The enclosure of claim 1, where the shock absorbing struts are integral with the outer surface enclosure.

* * * * *